United States Patent [19]
Marcus et al.

[11] Patent Number: 5,933,488
[45] Date of Patent: Aug. 3, 1999

[54] AUTOMATED METHOD AND ARRANGEMENT FOR INTEGRATING A TELEPHONE SYSTEM WITH AN ANNOUNCEMENT SYSTEM

[75] Inventors: Rodrigo Tyrone Marcus, San Francisco; William Joseph Beyda, Cupertino; Shmuel Shaffer, Palo Alto, all of Calif.

[73] Assignees: Siemens Information; Communication Networks, Inc., both of Boca Raton, Fla.

[21] Appl. No.: 08/844,416

[22] Filed: Apr. 18, 1997

[51] Int. Cl.⁶ .............................. H04M 3/50; H04M 11/02
[52] U.S. Cl. .................. 379/217; 379/88.15; 379/88.16; 379/88.23; 379/164; 379/199; 379/374
[58] Field of Search .......................... 379/76, 217, 67.1, 379/88.16, 88.23, 88.24, 88.25, 88.26, 88.15

[56] References Cited

U.S. PATENT DOCUMENTS

| | | | |
|---|---|---|---|
| 4,642,425 | 2/1987 | Guinn, Jr. et al. | 455/31.2 |
| 4,720,848 | 1/1988 | Akiyama | 379/88 |
| 4,741,020 | 4/1988 | Deal et al. | 379/67.1 |
| 4,825,456 | 4/1989 | Rosenberg | 455/31.2 |
| 4,837,797 | 6/1989 | Freeny, Jr. | 379/96 |
| 4,922,526 | 5/1990 | Morganstein et al. | 379/157 |
| 5,131,048 | 7/1992 | Farenelli et al. | 381/81 |
| 5,140,626 | 8/1992 | Ory et al. | 455/31.2 |
| 5,541,981 | 7/1996 | Lynn | 379/88.25 |
| 5,594,784 | 1/1997 | Vellus | 379/88 |
| 5,604,791 | 2/1997 | Lee | 379/67 |
| 5,754,627 | 5/1998 | Butler et al. | 379/63 |
| 5,768,347 | 6/1998 | Beyda | 379/67 |

FOREIGN PATENT DOCUMENTS

| | | | |
|---|---|---|---|
| 0 536 949 A2 | 4/1993 | European Pat. Off. | H04M 3/54 |
| 0 691 777 A2 | 1/1996 | European Pat. Off. | H04M 3/50 |
| 60-51396 | 3/1985 | Japan | H04Q 3/58 |
| 04176220 | 6/1992 | Japan | H04B 17/26 |
| 5-136884 | 6/1993 | Japan | H04M 3/42 |
| 2 251 359 | 7/1992 | United Kingdom | H04Q 7/00 |

OTHER PUBLICATIONS

Copy of International (PCT) Search Report mailed Jul. 28, 1998.

*Primary Examiner*—Daniel S. Hunter
*Assistant Examiner*—Roland G. Foster

[57] ABSTRACT

A method and arrangement of utilizing an announcement system to provide paging capability for a facility includes automating the integration of a telephone switch, a voice-mail system, and an announcement system. An unanswered call to a telephone of the facility is forwarded to the voicemail system, establishing a first connection between the telephone of the calling party and the voicemail system. The caller is presented with the option of recording a message or initiating a broadcast of an audible page announcement. If the announcement option is selected, a second connection that is separate from the first connection is formed from the voicemail system to the announcement system. An audible announcement identifies the availability of the call for retrieval by the particular called party. In the preferred embodiment, access to the waiting call is restricted to either or both of verification of a password and verification that the retrieval is from one of a limited number of authorized telephones. Security and privacy are further enhanced by restricting access to the announcement procedure in accordance with the preferred embodiment. Multi-tier call notification may be employed, with differences in the tiers being based either upon regions of broadcast (e.g., localized versus general-facility announcements) or upon modes of paging (e.g., overhead announcements versus a page to a particular remote page device).

16 Claims, 3 Drawing Sheets

AUTOMATED METHOD AND ARRANGEMENT FOR INTEGRATING A TELEPHONE SYSTEM WITH AN ANNOUNCEMENT SYSTEM

BACKGROUND OF THE INVENTION

The invention relates generally to methods and systems for notifying a called party that a waiting call is available for pickup and more particularly to automating an announcement system for a facility having multiple telephone units.

DESCRIPTION OF THE RELATED ART

A business or other facility which includes a number of telephones may include a telephone switch that allows direct inward dialing (DID) to a desk of a particular person within the facility. For example, a private branch exchange (PBX) may be used to assign a different extension number for each PBX station line that extends to a telephone. The DID feature accommodates an automatic routing of a call from outside of the facility to the telephone assigned to the called party. Routing of intra-facility calls is also automatic.

If a facility has an announcement system, such as an overhead paging system, the PBX is often configured to route unanswered calls to an operator or receptionist. For example, a telephone in the office of a cardiologist may be allowed to ring four times before the call is routed to an operator employed at a hospital. The operator greets the caller and may offer to page the cardiologist using the overhead system. If the caller requests the page, the operator places the call on hold and issues the page. The call is then monitored to determine whether a person picks up the call. The monitoring may be performed by the operator or by the PBX. Monitoring by the PBX may be implemented by setting a maximum time for which the call can be parked, and generating a ring-back to the operator if the maximum time is exceeded.

One concern with this process is that there are often privacy and security issues. In the hospital example, the parked call may be picked up by someone other than the cardiologist, since the announcement typically identifies both the doctor and the extension on which the call is parked. A calling party may be unaware that he or she is speaking to a person posing as the called party.

Another concern is that the process is labor-intensive. The operator or receptionist must speak with the calling party prior to initiating the announcement, must articulate the announcement, and must handle the ring-back calls if the paged person does not pickup the extension. For the ring-back calls, the operator may be required to take a message or to offer the option of transferring the call to a voicemail system.

Yet another concern in the use of overhead announcement systems to provide call notification involves human inconsistencies. Different persons will have different voice qualities, amplitudes, and clarifies. As a result, there may be some difficulties in understanding pages.

With the exception of the security concern, there have been improvements to the call-notification process. For example, the ring-back situation for unanswered pages may transfer a caller directly to the voicemail box of the called party in another development. U.S. Pat. No. 4,741,020 to Deal et al. describes an overhead announcement system for paging store clerks having specialized knowledge to help customers. For customers on a telephone, clerks are paged using a two-part message in which the first part, typically a department name, is determined by a button pushed by the store's telephone operator and the second part consists of the telephone line number. A typical message would be "Plumbing, line 2." The use of stored-speech messages to provide the paging standardizes the messages and announcements. However, the security issues remain. Moreover, the announcement process still requires intervention by a telephone operator of the facility.

U.S. Pat. No. 5,131,048 to Farenelli et al. describes an audio distribution system for use in homes. The system controls the broadcast of different types of signals through speakers located in various zones, using a control circuit which responds to inputs of music, intercom, page, and doorbell signals. A telephone handset at the home includes a page button. When the page button is depressed, the telephone handset generates a monaural paging signal. The system includes a page interface circuit that is responsive to the telephone handset to generate a control signal, serve as a power source to the telephone handset, and process an audio signal from the telephone handset. The system operates well within the home environment, but its application to a business facility is limited.

U.S. Pat. No. 5,541,981 to Lynn describes an automated announcement system that allows messages to be played on a public address system and/or displayed on a display device in accordance with a predefined schedule that maintains a minimum interval between messages. The system resolves conflicts between messages to be played at the same time by assigning priorities to the messages. An example of a use of the system is to play recorded announcements that inform customers of special sale events or promotions. In addition to the prerecorded messages, live announcements may be presented. The live announcements may be provided using a connection to a PBX pager output. That is, a call may be made to the PBX by a person who wishes to make an announcement. Preferably, a multi-level password protection scheme is implemented to restrict specific system functions to authorized users. The availability of a live announcement option may require input of a password.

In addition to overhead announcement systems, wireless pagers may be used to notify a party that a call is available. U.S. Pat. No. 4,825,456 to Rosenberg discloses an apparatus for providing call notification via pagers. A number of pager transmitters are connected to telephone extension lines by means of interface circuits. Each interface circuit includes a ring signal detector to detect activation of the associated telephone extension line. The detection triggers a pager transmitter activator, which activates the pager of the appropriate individual.

A similar apparatus is described in U.S. Pat. No. 4,642,425 to Guinn, Jr. et al. An incoming call is placed on hold while the pager of the called party is activated. The called party is then able to pickup the call at a local telephone within the facility. If there is a one-to-one correspondence between the calls and the pagers that are activated in response to the call, the security concerns are alleviated. However, the increase in security comes at a sacrifice of increased system costs, relative to overhead announcement systems.

What is needed is a method and arrangement for utilizing an announcement system to provide paging capability for facilities having a large number of telephones, with the utilization preferably being implemented in a cost-efficient and privacy secure manner.

SUMMARY OF THE INVENTION

A method and arrangement for utilizing an announcement system to provide paging capability includes automating integration of a telephone switch, a voicemail system, and an announcement system of a facility having a number of telephones, with each telephone being associated with a particular user. Unanswered calls are forwarded to the voicemail system, so that a first connection is formed between the voicemail system and a telephone of the calling party. A second connection is then formed between the voicemail system and the announcement system. The second connection is separate from the first connection, preventing the calling party from entering a live announcement. Instead, as an automated response to establishing the second connection, an audible announcement is triggered. The audible announcement identifies the availability of the call for retrieval by a particular called party. In the preferred embodiment, the access to the waiting call is restricted by either or both of verification of a password and verification that the retrieval is from one of a limited number of authorized telephones.

The preferred embodiment further includes parking the call from the calling party prior to triggering the audible announcement, thereby terminating the first connection to the voicemail system and allowing immediate access to the call by the called party. The call is parked on a known telephone line, such as a "dummy extension." The audible announcement includes identifications of both the known telephone line and the called party, i.e., the identified user. A threshold time for pickup is preselected. If the call is not retrieved prior to expiration of the threshold time, the waiting call is returned to the voicemail system.

Still referring to the preferred embodiment, the audible announcement is a first tier of a multi-tier notification scheme. The different tiers may be based upon regions. For example, the first announcement may be a localized announcement within the facility, while the second tier may be audible only within a different localized region or may be a general-facility announcement. Alternatively, the differences in the tiers of the multi-tier notification scheme may be based upon modes of paging the identified party. For example, the first mode is the public announcement system, while a backup mode may be to notify a wireless pager carried by the identified party. Alternative announcement systems are also available. As an example, one audible announcement system may include overhead speakers, while a second announcement system may use the intercom feature of a facility having speaker telephones.

As previously noted, the calling party is connected to the voicemail system prior to any connection to the announcement system. Therefore, the calling party may be presented with certain options. The calling party may select between leaving a voice message and initiating the announcement process. In one embodiment, the access to the announcement process is restricted by input of a password or by recognition that the calling party is at one of a designated number of telephones. If the multi-tier notification scheme is utilized, the transitions from one tier to the next may be strictly time-related or may be implemented at the option of the calling party, e.g., if the use of one tier fails to result in a call pickup, the unanswered call is returned to the voicemail system and the caller is presented with the option of triggering the second tier or leaving a message.

DETAILED DESCRIPTION

Figure 1:
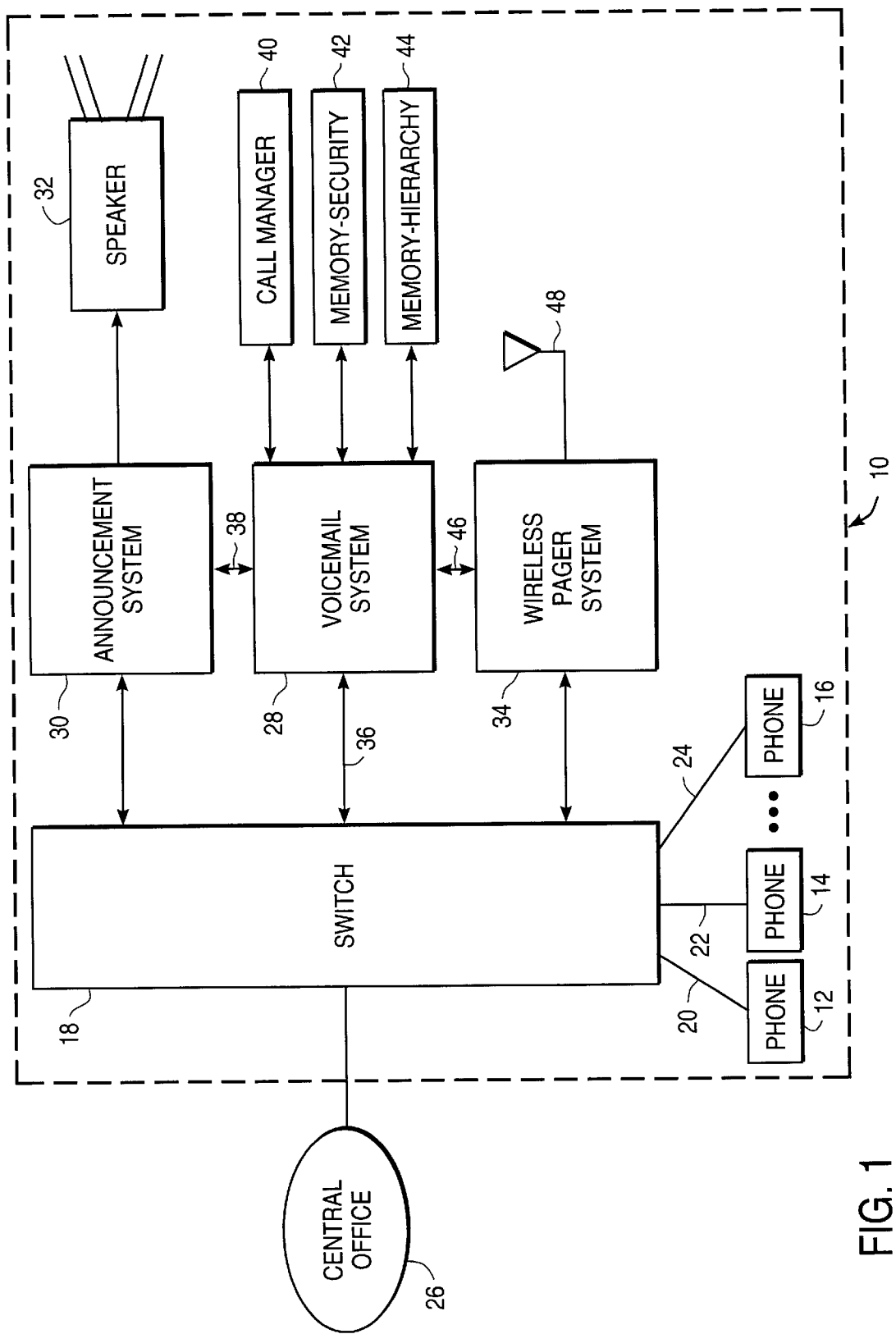
FIG. 1 is a block diagram of a facility having an automated integration of a switch, a voicemail system, and an announcement system in accordance with the invention.

With reference to FIG. 1, a facility 10 is shown as including a number of telephones 12, 14 and 16. Each telephone is connected to a switch 18 via a different station line 20, 22 and 24. The switch may be a PBX, but this is not critical. While not shown in FIG. 1, the switch preferably includes "dummy extensions," i.e., extensions which are not directly tied to a telephone, allowing a call to be parked for subsequent retrieval.

A call from outside of the facility 10 is routed to the switch 18 via a central office 26, as is well known in the art. Each of the telephones 12, 14 and 16 is assigned to a particular user and has a unique phone number. A direct inward dialing (DID) feature of the switch 18 permits an external caller to reach a particular phone of one of the users. Thus, the called party can be identified by the phone number dialed by the calling party. This phone number is received in the calling information during the setup of the call.

Internal calls from one of the telephones 12, 14 and 16 to another one of the telephones require only the extension number to be dialed by the calling party. Often, this is a two-digit to a five-digit number that is identical to the last several digits that must be dialed by an external caller.

An unanswered internal or external call to one of the telephones 12, 14 and 16 may be directed to a voicemail system 28. The forwarding of a call to a voicemail system is known in the art. The forwarding is typically an automated rerouting by the switch 18. In addition to the switch and the voicemail system, the facility includes an announcement system 30. The announcement system provides audible announcements via at least one speaker 32, and is distinguishable from a wireless pager system 34. The speaker or speakers may be overhead devices or may be contained within each one of the telephones 12, 14 and 16. That is, the telephones may be speaker phones. Other schemes for audibly identifying the availability of calls for pickup by particular parties may also be utilized.

In operation, intersystem cooperation is achieved without requirement of an operator. When a call is unanswered, a first connection 36 is formed between the switch 18 and the voicemail system 28 to connect the calling party with the voicemail system. In the preferred embodiment, the caller is presented with the option to either leave a voice message or initiate an announcement process. For example, the caller may be instructed to press the "1" key of a telephone keypad to select the message option, or to press the "2" key to initiate the announcement process. If the announcement option is selected, a second connection 38 is established. The second connection is illustrated as a direct connection between the voicemail system 28 and the announcement system 30, but typically the connection is formed via the switch 18. A prerecorded message is audibilized via the speaker or speakers 32. The triggered prerecorded message identifies the called party and an extension at which the waiting call is parked. If the switch 18 is utilized to park the call, the first connection 36 may be terminated upon parking the call. On the other hand, if the voicemail system 28 is used to park the call, the first connection 36 remains intact. Particularly in embodiments in which the voicemail system is used to park the call, a call manager 40 is beneficial in handling calls routed to the voicemail system. Two memory modules 42 and 44 are also shown as being connected to the voicemail system. The functions of the memory modules will be described fully below.

Optionally, the wireless pager system 34 may be activated if the paged party does not pickup the waiting call within a preselected period of time. The call is again forwarded to the voicemail system 28, which automatically establishes a connection 46 with the wireless pager system. The information required for paging the called party is transferred from the voicemail system 28 to the wireless pager system. This information may be stored at the second memory module 44. The type of pager system is not critical to the invention. In one embodiment, radio frequency signals that are specific to one remote pager device are transmitted via an antenna 48.

One advantage of the invention is that the automation of the call-notification operations eliminates the need of a full-time operator at the facility 10. Another advantage is that prerecorded paging messages may be used to provide a uniform voice and format and to ensure sufficient clarity, amplitude and quality.

Another important advantage relates to security and will be described fully below. Access to the announcement procedure may be restricted by use of a password or by designating a limited number of authorized telephones. Moreover, access to calls that have been announced may be limited by requiring a password or by designating only certain phones as authorized phones for retrieving a particular parked call. The automated process allows each person who may be the object of a page to be reached within selected paging zones, with password protection.

The call-notification process will be described more fully with reference to FIG. 2. In step 50, announcement information is stored. Typical announcements will include the identification of a person and an extension at which a call is parked. In a hospital setting, an exemplary announcement is "Doctor Green, please pickup extension 2136." The various announcements are stored at the voicemail system 28, but may be stored at the announcement system 30 of FIG. 1.

In step 52, external and internal calls directed to one of the telephones 12, 14 and 16 are detected and routed using conventional techniques. The switch 18 is used to route the calls. PBXs allow a user of one of the telephones 12, 14 and 16 to notify the PBX that the user will be away from the telephone, so that incoming calls are immediately routed to the voicemail system 28. PBXs also allow the phone to ring a set number of times, but then presume that the user is unavailable. In step 54, calls directed to an unavailable user or to a busy phone are forwarded to the voicemail system.

Conventional voicemail systems merely allow a calling party to leave a message in the voicemail box of the called party. However, the preferred embodiment of the invention is one in which the calling party is presented with options. In a personalized greeting, the called user may instruct the caller to press a certain key (e.g., "1") or sequence of keys to leave a message, or to press a different key (e.g., "2") or sequence of keys to initiate a page announcement. The decision step is shown at 56 in FIG. 2.

Figure 3:
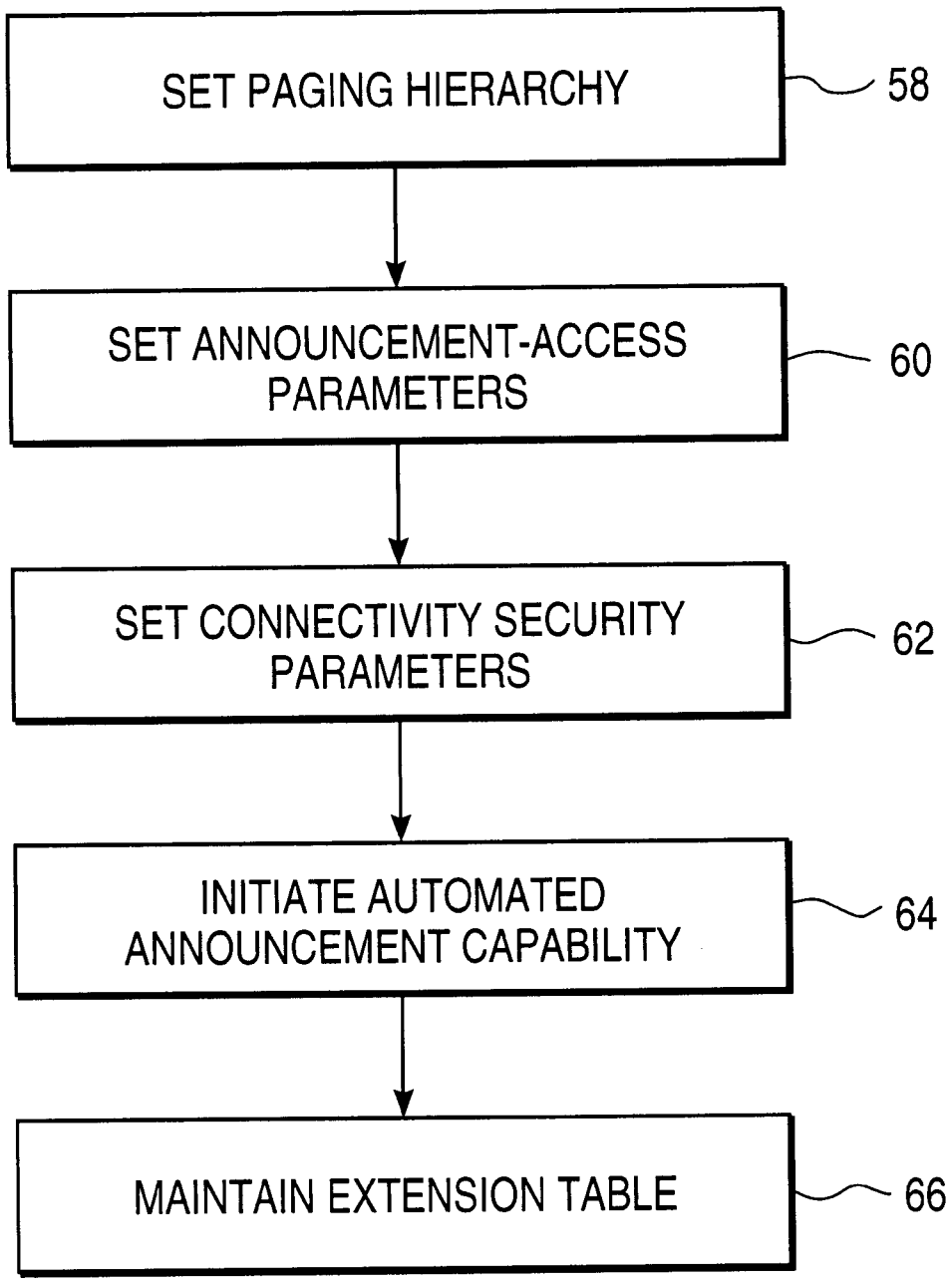
FIG. 3 is a process flow of initiating the intersystem arrangement of FIG. 1.

In addition to recording the page announcement information at step 50 and recording the personalized greeting within the voicemail system 28, there are other setup options and requirements. FIG. 3 illustrates some of the possible setup steps. Firstly, a paging hierarchy may be formed 58. As previously noted, the hierarchy may be based upon area, based upon modes of paging, or both. An area-based hierarchy may have a first level in which the triggered announcement is audible on only one floor of a hospital and may have a second level in which the page announcement is broadcast on all floors of the hospital. A mode-based hierarchy for the facility 10 of FIG. 1 may utilize the announcement system 30 to broadcast the page announcement, with the wireless pager system 34 being used if the page announcement does not result in a call pickup. In the preferred embodiment, the hierarchy is determined on a user-by-user basis. That is, each user is enabled to select a desired hierarchy. However, the selection may be facility-wide. The selected hierarchy is stored in the memory module 44 of FIG. 1.

The setup step 60 in FIG. 3 provides a first level of security. Optionally, only designated individuals are authorized to utilize the announcement system 30. All other callers may merely leave a message at the appropriate voicemail box of the voicemail system 28. In one embodiment, the announcement-access is enabled only if a caller inputs a password, such as a particular sequence of digits. For example, there may be a personal identification number (PIN) that is input using the keypad of a conventional telephone. As an alternative to the password-based access enablement, there may be a limitation to the telephones that may be used to trigger a page announcement. As one example, automated access to the announcement system may be restricted to calls initiated from one internal telephone 12, 14 and 16 to another one of the internal telephones. In another example, caller identification information received as a result of an incoming external call may be used as a basis to determine announcement-access. That is, the announcement-access parameters set in step 60 may be a designation of certain external telephones to which access is to be restricted. Similar to step 58, the parameters of step 60 may be individualized or may be facility-wide. The settings are stored in the memory module 42 of FIG. 1.

In step 62, connectivity-security parameters are set. These parameters may be used to limit the access to a waiting call. Privacy and/or security interests may dictate limitations on the availability of call pickup. As an example, a caller may not recognize a doctor by voice, so that any person within a hospital could attempt to pose as a paged doctor and ask personal questions. The connectivity-security parameters set in step 62 may require a person attempting to retrieve a call to enter a password (e.g., a PIN) before the parties are connected. In another embodiment, these retrieval limitations are related to designating certain internal phones 12, 14 and 16 as authorized phones. A particular user may designate a telephone in a backup office of the user as the only authorized phone for retrieving calls that are the subjects of page announcements identifying the user. The retrieval limitations are preferably selected on a user-by-user basis. The parameters are stored in the memory module 42 of FIG. 1.

The automated announcement capability is then initiated at step 64. As will be explained more fully below, the system monitors available extensions for parking the calls that are the subjects of page announcements. Step 66 is included to identify the process of maintaining the extension table.

Returning to FIG. 2, the decision step 56 is determined at a first level by the announcement-access parameters selected in step 60 of FIG. 3 and stored in the memory module 42 of FIG. 1. At a second level, the calling party selects between recording a message and triggering a broadcast of a page announcement. Step 68 of recording a message is implemented using conventional techniques of voicemail systems. On the other hand, if the calling party is authorized and elects the announcement option, the relevant page parameters are determined at step 70. The selected paging hierarchy of the memory module 44 may dictate that the page announcement is to be made only within a localized region. In some embodiments, the calling party is presented with options relating to the area in which the page announcement is to be broadcast.

The voicemail system 28 then parks the call at step 72. A limited number of "dummy extensions" may be configured in the switch 18. Each of the dummy extensions is capable of holding a waiting call. The voicemail system may implement this step by sending a park command to the switch 18. As an example, the park command may be PARK 2136, where PARK is the system PARK command or button and where 2136 is one of the dummy extensions. In order for the voicemail system to monitor the extensions, the extensions must be preconfigured within the voicemail system. As noted with reference to step 66 in FIG. 3, the voicemail system may use an extension table to track the hold-and-retrieval process. While the call is parked at a dummy extension, the caller will hear ring-back tone or on-hold music, depending upon the configuration of the switch 18.

The voicemail system 28 is then able to release the line, since the call is parked on the dummy extension. The voicemail system then goes off-hook on an available channel/port to form the second connection 38 between the voicemail system 28 and the announcement system 30. This intersystem connectivity is shown at step 74 in FIG. 2. While the connectivity is illustrated as a direct connection in FIG. 1, typically the connectivity requires the operation of the switch 18. The off-hook condition of the available channel/port relates to a connection to the switch 18. The voicemail system dials P, where P is the system paging access command. This may be controlled by the call manager 40. The call manager then causes the appropriate announcement information to be played, e.g., "Doctor Green, please pickup extension 2136." The announcement is shown at step 76 in FIG. 2. The interconnection between the voicemail system 28 and the announcement system 30 may then be terminated.

Extension 2136 is marked in the extension table as being occupied by the waiting call. The next caller requesting an announcement may be parked at dummy extension 2137, until all of the available dummy extensions are utilized. If no dummy extension is available for a call, the voicemail system can transfer the next caller to an available operator.

In step 78, the time required for a paged party to retrieve a call is monitored. Preferably, a recall time is established by configuring the voicemail system 28 or the switch 18. If during the decision step 80 the parked call is retrieved, any relevant access parameters are checked at step 82. This includes enforcing the connectivity-security parameters set at step 62 in FIG. 3. The security check is intended to preserve the privacy of the calling party and/or to reduce the susceptibility of the intersystem process to unauthorized dissemination of information. Provided that the person attempting to retrieve the call is authorized, the parties are connected at step 84.

The voicemail system 28 preferably includes a parameter that defines a wait-time between parking calls on an individual dummy extension. Immediately after a call is parked on the extension, the voicemail system starts the timer. After the time expires, the voicemail system assumes that the extension is again available for a parked call. This parameter should be a few seconds longer than the recall time described with reference to the step 78 of timing the call retrieval.

The call retrieval time relevant to steps 78 and 80 is configured in the switch 18 as the maximum time that a call remains parked on an extension before a recall is initiated. In the embodiment of FIG. 2, if the call is not retrieved before expiration of the designated time, the call is again forwarded to the voicemail system at step 54. The voicemail system typically receives some identifying information in the signaling channel, if one exists (e.g., an ISDN environment). At the least, caller identification information is forwarded to the voicemail system with an indication that the call is a returning one from the PARK condition. As a result, the voicemail system plays the appropriate prompt, such as "Doctor Green did not answer the page." In the preferred embodiment, the prompt also includes options. The caller may again be presented with the option of recording a message at step 68. In a multi-tier scheme, the caller may be presented with the option of implementing a second tier of call notification. As previously noted, the second tier may be a difference with respect to the area in which an audible announcement is broadcast, or may be a switch to a different system. In FIG. 1, the call manager 40 may initiate the connection 46 to activate the remote pager of the called party. While the connection 46 is shown as the direct connection between the voicemail system 28 and the wireless pager system 34, typically the interaction between the two systems is achieved utilizing the switch 18. For example, the voicemail system may go off-hook on an available channel/port to the switch 18 and dial the appropriate access command for activating the wireless pager system. Some wireless pager systems allow the display of numeric codes on the remote pager devices. In such an embodiment, the voicemail system may be used to outpulse the required dual tone multi-frequency (DTMF) tones to notify the user that he or she can call in and pickup the parked call. Pagers that include alphanumeric displays are contacted by the voicemail system using the appropriate protocol for the particular system.

Remote pager devices may play short voice messages. In such a situation, the voicemail system 28 of FIG. 1 may contact the pager system 34 and play the same message that was sent to the announcement system 30 for broadcast. A special external pickup feature may be implemented in the switch 18 to allow a user to call in from an external phone in order to retrieve the parked call. As an alternative, the paged external caller may contact an operator at the facility 10 and request that the operator establish the connectivity between the parties.

Figure 2:
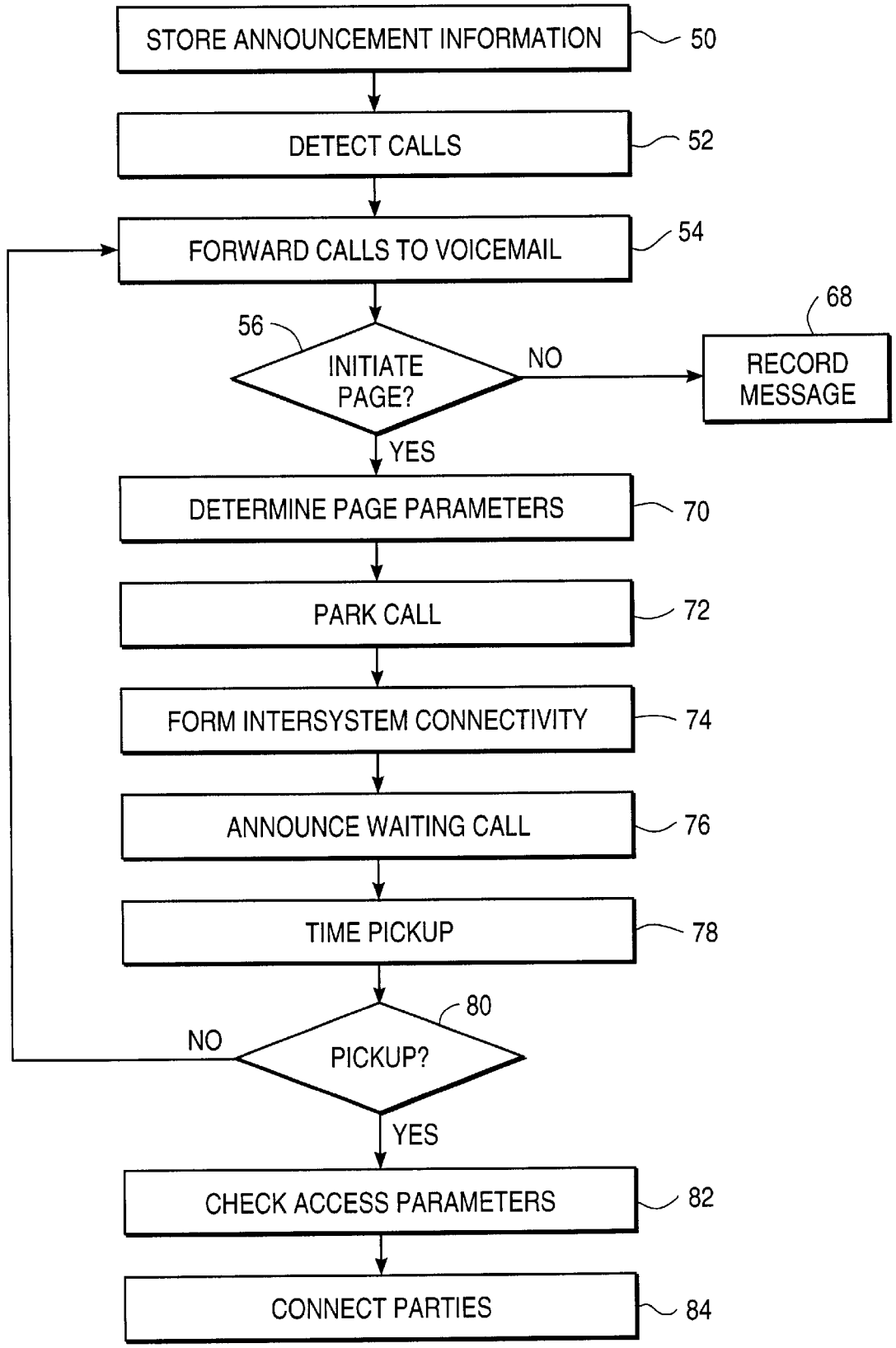
FIG. 2 is a process flow of steps for utilizing the intersystem arrangement of FIG. 1 for providing paging capability.

In embodiments that include the multi-tier notification scheme, the appropriate sequence of steps that follow the decision step 56 in FIG. 2 are followed a second time. Thus, the parked call is either retrieved prior to the expiration of the time limit of step 78 and the parties are connected at step 84, or the call is returned to the voicemail system from the decision step 80. If all of the tiers are implemented without success, the calling party is informed that the only remaining option is recording a message at step 68.

As an alternative to the embodiment described above, the unanswered call may be parked logically or physically in the voicemail system 28. The user who is paged would then access the call by logging onto the voicemail system. As another alternative to the arrangement described above, the central office 26 of FIG. 1 may perform the functions of the switch 18. That is, an on-site switch is not critical.

While the invention has been described and illustrated as including a "parking lot" of dummy extensions, this is not critical. Switches having built-in parking areas are known, so that there is no need for the preconfiguration of dummy extensions. A system parking area is sometimes referred to as a system park, a system orbit, or an array of system spaces.

What is claimed is:

1. A method of utilizing an announcement system to provide paging capability for calls forwarded to a voicemail system of a facility having a plurality of telephones, each telephone being associated with a particular user, said method comprising steps of:

directing a call received at said facility to a specific telephone associated with an identified user, said call being intended for said identified user;

transferring said call to said voicemail system as an automated response to determining that said specific telephone has not been answered within a predetermined time interval, including establishing a first connection between said voicemail system and a telephone of a calling party, said voicemail system being capable of storing a voice message from said calling party for subsequent retrieval by said identified user;

as a first step establishing a second connection between said voicemail system and said announcement system, said second connection being separate from said first connection; and parking said call on a known telephone line to terminate the first connection;

establishing a second connection between said voicemail system and said announcement system, said second connection being separate from said first connection; and as an automated response to establishing said second connection, triggering an audible announcement of availability of said call for pickup by said identified user;

wherein the audible announcement is capable of verbally identifying said known telephone line and said identified user;

wherein at least one of the steps of triggering said audible announcement and establishing connectivity is selectively implemented to restrict access to either or both of triggering said areawide audible announcement and said pickup of parked call at said telephone line; and as a second and following steps triggering said audible announcements in tiers of a multi-tier call-notification scheme in which differences in tiers are based upon at least one of regions of said facility in which said audible announcement is broadcast and modes for identifying said identified user.

2. The method of claim 1 further comprising a step of selecting a threshold time for pickup of said call by said identified user following said audible announcement, wherein said call is returned to said voicemail system for recording a voice message from said calling party upon expiration of said threshold time.

3. The method of claim 1 further comprising a step of routing said call such that said call is accessible by said identified user via a third connection, wherein establishing said third connection includes imposing at least one access restriction.

4. The method of claim 3 wherein said step that includes imposing said at least one access restriction further includes requiring input of a predetermined password prior to establishing said third connection.

5. The method of claim 3 wherein said step that includes imposing said at least one access restriction further includes storing identifications of a limited number of said telephones through which calls to said identified user can be accessed.

6. The method of claim 1 wherein said step of establishing said second connection is executed selectively to accommodate restrictive access to said announcement system based upon identification of said calling party.

7. The method of claim 6 wherein said step of accommodating restrictive access includes requiring said calling party to input a password as a condition to establishing said second connection.

8. The method of claim 6 wherein said step of accommodating restrictive access includes storing caller identification information indicative of selected telephones and further includes comparing said stored caller identification information to call data received in establishing said first connection, said call data being indicative of said telephone of said calling party.

9. A call-notification method for a facility having a plurality of telephones and an announcement system; with each telephone being associated with a particular user, said method comprising steps of:

determining a presence of a call directed to a first telephone that is associated with a first user;

presenting options to a calling party of said call to record a voicemail message or to trigger an audible announcement, said options being presented when said call is unanswered at said first telephone;

parking said call;

in response to selection of said option to trigger said audible announcement, as a first step triggering an areawide audible announcement on the said announcement system that verbally identifies said first user as having an available call; and establishing connectivity of said call to one of said telephones in response to pickup of said parked call; and as a second and following steps triggering said audible announcements in tiers of a multi-tier call-notification scheme in which differences in tiers are based upon at least one of regions of said facility in which said audible announcement is broadcast and modes for identifying said identified user;

wherein at least one of steps of presenting said option to trigger said audible announcement and establishing connectivity is selectively implemented to restrict access to either or both of triggering said areawide audible announcement and said pickup of said parked call.

10. The method of claim 9 wherein said step of presenting said options includes connecting said call to a voicemail system and providing a voicemail prompt that presents said options.

11. The method of claim 9 wherein said selective implementation includes storing a password for each user such that there is a one-to-one correspondence between passwords and said users.

12. The method of claim 9 wherein said selective implementation includes storing identifications of a limited number of telephones to which said access is extended.

13. An intersystem arrangement for a facility having a plurality of telephones comprising:

a switch for handling connections for calls directed to and from said telephones;

a voicemail system connected to said switch to receive calls which are unanswered at telephones to which said calls are directed, said voicemail system having established voice prompts, including a first voice prompt indicative of an option to trigger an areawide audible announcement of a called party, park the said received call at a known telephone line on the said switch, said voice prompts including a second voice prompt indicative of an option to record a message form a caller;

an announcement system responsive to a selection of said option of said first voice prompt, said announcement system being connected to speaker means for audibilizing said areawide audible announcement that verbally identifies said known telephone line and identified user in a multi-tier call-notification scheme in which differences in tiers are based upon at least one of regions of said facility in which said audible announcement is broadcast and modes for identifying said identified user; and security means for restricting access to call announcement and pickup capability provided by interconnection of said voicemail system with said switch and said announcement system.

14. The intersystem arrangement of claim 13 wherein said security means includes memory containing passwords having a one-to-one correspondence with authorized users.

15. The intersystem arrangement of claim 13 wherein said security means includes memory containing identifications of telephones for which said access is authorized.

16. The intersystem arrangement of claim 13 wherein said security means relates to restricting access to retrieval of calls which are unanswered and which are identified in one of said areawide audible announcements.

* * * * *